US006180916B1

(12) United States Patent
Xuan

(10) Patent No.: US 6,180,916 B1
(45) Date of Patent: *Jan. 30, 2001

(54) METHOD OF MANUFACTURING A MAGNETIC RECORDING MEDIUM WITH A LASER TEXTURED DATA ZONE

(75) Inventor: Jialuo Jack Xuan, Milpitas, CA (US)

(73) Assignee: Seagate Technology LLC, Scotts Valley, CA (US)

( * ) Notice: Under 35 U.S.C. 154(b), the term of this patent shall be extended for 0 days.

This patent is subject to a terminal disclaimer.

(21) Appl. No.: 09/264,887

(22) Filed: Mar. 9, 1999

Related U.S. Application Data

(60) Division of application No. 08/972,229, filed on Nov. 17, 1997, now Pat. No. 6,021,032, which is a continuation-in-part of application No. 08/955,448, filed on Oct. 21, 1997, which is a continuation-in-part of application No. 08/954,585, filed on Oct. 20, 1997, now Pat. No. 5,952,058.
(60) Provisional application No. 60/037,627, filed on Jan. 15, 1997.

(51) Int. Cl.$^7$ .................................................. B23K 26/00
(52) U.S. Cl. .............................. 219/121.69; 219/121.75; 219/121.77
(58) Field of Search ...................... 219/121.75, 121.73, 219/121.68, 121.69, 121.76, 121.77; 427/554, 555; 360/135

(56) References Cited

U.S. PATENT DOCUMENTS

| 3,674,340 | 7/1972 | Jacob . |
| 3,764,218 | 10/1973 | Schedewie . |
| 3,938,878 | 2/1976 | Fox . |

(List continued on next page.)

FOREIGN PATENT DOCUMENTS 0 652 554 A1    5/1995  (EP) .

OTHER PUBLICATIONS

Johnson et al., "In–Plane Anisotropy in Thin–Film Media: Physical Origins of Orientation Ratio (Invited)", IEEE Transactions on Magnetics, vol. 31, No. 6, Nov. 1995, pp. 2721–2727.

Miles et al., "Micromagnetic Simulation of Texture Induced Orientation in Thin Film Media", IEEE Transactions on Magnetics, vol. 31, No. 6, Nov. 1995, pp. 2770–2772.

Kissinger et al., "Fiber–Optic Probe Measures Runout of Stacked Disks", Jul.–Aug. 1997, Data Storage, pp. 79–84.

Baumgart et al., "A New Laser Texturing Technique for High Performance Magnetic Disk Drivers", IEEE Transactions on Magnetics, vol. 31, No. 6, pp. 2946–2951, Nov. 1995.

Kuo et al., "Laser Zone Texturing on Glass and Glass–Ceramic Substrates", presented at the Magnetic Recording Conference (TMRC), Santa Clara, California, Aug. 19–21, 1996.

Baumgart et al., "Safe landings: Laser texturing of high–density magnetic disks", Data Storage, Mar. 1996.

Tam, "Laser–cleaning techniques for removal of surface particulates", J. Appl. Phys. 71(7), Apr. 1, 1992, pp. 3515–3523.

"Delivering Nd:YAG Laser Beams the Easy Way" by Richard Cunningham in *Laser & Optronics*, pp. 59, 60, 62 and 64, Sep. 1990.*

* cited by examiner

*Primary Examiner*—Geoffrey S. Evans
(74) *Attorney, Agent, or Firm*—McDermott, Will & Emery

(57) ABSTRACT

The substrate of a magnetic recording medium is laser textured using a continuous wave laser light beam and microfocusing lens system to form a laser textured data zone comprising a plurality of substantially uniform concentric microgrooves. A suitable microfocusing lens system includes an array of horizontally and vertically spaced apart microfocusing lenses, each optically linked to a fiber optic cable.

29 Claims, 3 Drawing Sheets

U.S. PATENT DOCUMENTS

| | | |
|---|---|---|
| 4,060,306 | 11/1977 | Swaminathan . |
| 4,139,263 | 2/1979 | Lehureau et al. . |
| 4,961,123 * | 10/1990 | Williams et al. ............ 360/135 |
| 5,062,021 | 10/1991 | Ranjan et al. . |
| 5,108,781 * | 4/1992 | Ranjan et al. . |
| 5,120,927 | 6/1992 | Williams et al. . |
| 5,128,914 | 7/1992 | Kurata et al. . |
| 5,153,785 | 10/1992 | Muranushi et al. . |
| 5,166,006 | 11/1992 | Lal et al. . |
| 5,202,810 | 4/1993 | Nakamura et al. . |
| 5,273,834 | 12/1993 | Hoover et al. . |
| 5,283,773 * | 2/1994 | Thomas et al. ............ 360/135 |
| 5,391,522 | 2/1995 | Goto et al. . |
| 5,402,407 | 3/1995 | Eguchi et al. . |
| 5,416,755 | 5/1995 | Endo et al. . |
| 5,430,816 * | 7/1995 | Furuya et al. ............ 219/121.76 |
| 5,550,696 | 8/1996 | Nguyen . |
| 5,595,791 * | 1/1997 | Baumgart et al. ............ 427/554 |
| 5,699,160 * | 12/1997 | Barenboim et al. . |
| 5,714,207 * | 2/1998 | Kuo ............ 427/555 |
| 5,723,033 * | 3/1998 | Weiss ............ 216/65 |
| 5,783,797 * | 7/1998 | Xuan et al. ............ 219/121.75 |
| 5,965,215 * | 10/1999 | Xuan ............ 427/554 |
| 5,976,714 * | 11/1999 | Arita et al. ............ 219/121.76 |
| 6,020,045 * | 2/2000 | Chen et al. ............ 427/555 |
| 6,021,032 * | 2/2000 | Xuan ............ 360/135 |

METHOD OF MANUFACTURING A MAGNETIC RECORDING MEDIUM WITH A LASER TEXTURED DATA ZONE

RELATED APPLICATIONS

This application is a divisional of application Ser. No. 08/972,229 now U.S. Pat. No. 6,021,032 filed Nov. 17, 1997.

This application claims priority from provisional patent application Ser. No. 60/037,627, filed Jan. 15, 1997, the entire disclosure of which is hereby incorporated by reference herein.

This application is a continuation-in-part application of U.S. patent application Ser. No. 08/955,448, filed Oct. 21, 1997, now pending, which, in turn, is a continuation-in-part of U.S. patent application Ser. No. 08,954,585, filed on Oct. 20, 1997 now U.S. Pat. No. 5,952,058. The entire disclosure of U.S. patent application Ser. No. 08/955,448 and the entire disclosure of U.S. patent application Ser. No. 08,954,585 now U.S. Pat. No. 5,952,058 are hereby incorporated by reference herein.

Some of the subject matter disclosed in this application is similar to subject matter disclosed in application Ser. No. 08/919,601 (now U.S. Pat. No. 5,837,330) filed on Aug. 28, 1997.

TECHNICAL FIELD

The present invention relates generally to laser texturing a magnetic recording medium. The present invention is particularly applicable to laser texturing a substrate for a high areal recording density magnetic recording medium.

BACKGROUND ART

Conventional magnetic disk drive designs comprise a commonly denominated Contact Start-Stop (CSS) system commencing when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

The escalating requirements for high areal recording density impose increasingly greater requirements on thin film magnetic media in terms of coercivity, coercivity, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head challenges the limitations of conventional technology for controlled texturing to avoid head crash.

Conventional techniques for providing a disk substrate with a textured surface comprise a mechanical operation, such as polishing. In texturing a substrate for a magnetic recording medium, conventional practices comprise mechanically polishing the surface to provide a data zone having a substantially smooth surface and a landing zone characterized by topographical features, such as protrusions and depressions. See, for example, Nakamura et al., U.S. Pat. No. 5,202,810. Conventional mechanical texturing techniques, however, are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. Such relatively crude mechanical polishing, with attendant non-uniformities and debris, does not provide a surface with an adequately specular finish or with adequate microtexturing to induce proper crystallographic orientation of a subsequently deposited magnetic layer on which to record and read information, i.e., a data zone.

Data zones are conventionally provided with a smooth specular finish or with a mechanically textured surface. In mechanically texturing a substrate surface for data recordation and reading, i.e., a data zone, deep scratches are formed for inducing a desired magnetic orientation. However, mechanical texturing disadvantageously results in non-uniform scratches believed to be due to non-uniform particle sizes of abrasive material ranging from about 0.1 $\mu$m to about 5 $\mu$m. In addition, various desirable substrates are difficult to process by mechanical texturing. This undesirably limiting facet of mechanical texturing, virtually excludes the use of many materials for use as substrates.

Laser technology has been employed to texture a substrate surface to form a topography suitable for a landing zone.

Such landing zone laser technology typically comprises impinging a pulsed, focused laser light beam on a non-magnetic substrate surface. Laser textured landing zones typically exhibit a topographical profile comprising a plurality of spaced apart protrusions extending above the substrate surface or a plurality of spaced apart depressions extending into the substrate surface. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving a specular data zone. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. See, also, U.S. Pat. Nos. 5,550,696 and 5,595,791

In copending application Ser. No. 08/666,374 filed on Jun. 27, 1996 a laser texturing technique is disclosed employing a multiple lens focusing system for improved control of the resulting topographical texture. In copending application Ser. No. 08/647,407 filed on May 9, 1996, a laser texturing technique is disclosed wherein a pulsed, focused laser light beam is passed through a crystal material to control the spacing between resulting protrusions.

In copending PCT application Ser. No. PCT/US96/06830, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clara, Calif., Aug. 19–21, 1996.

In copending application Ser. No. 08/796,830 filed on Feb. 7, 1997, a method is disclosed for laser texturing a glass or glass-ceramic substrate, wherein the height of the protrusions is controlled by controlling the quench rate during resolidification of the laser formed protrusions. One of the disclosed techniques for controlling the quench rate comprises preheating a substrate, as by exposure to a first laser light beam, and then exposing the heated substrate to a focused laser light beam.

As areal recording density increases the flying height must be reduced accordingly, thereby challenging the limitations of conventional laser texturing technology for uniformity and precision in forming a textured landing zone comprising a plurality of protrusions. The requirements for continuous alignment and adjustment of a laser beam are exacerbated in geographic locations with relatively unstable environmental conditions, such as temperature, vibration and shock, particularly in regions susceptible to seismological disturbances such as tremors and earthquakes. Conventional laser delivery systems for texturing a landing zone comprise a system of mirrors and lenses which must be precisely and accurately maintained, particularly as the flying height is reduced to a level of less than about 300 Å, due to inherent undulations of the substrate surface. Uniform and precise texturing require continuous maintenance of alignment of a system of mirrors and lenses. It is extremely difficult to maintain the requisite precise alignment and satisfy the reduced flying height requirements for high areal recording density, particularly in geographical locations subjected to environmental changes, and seismological disturbances.

In copending application Ser. No. 08/954,585, filed on Oct. 20, 1997 now U.S. Pat. No. 5,952,058, an apparatus and method are disclosed for laser texturing a substrate employing a fiber-optic laser delivery system wherein sub-laser beams are passed through plural fiber optic cables and microfocusing lens to impinge on opposite surfaces of a rotating substrate. The use of a fiber optic cable delivery system facilitates alignment and reduces maintenance, even in geographical areas subject to environmental changes, particularly seismological disturbances. In copending application Ser. No. 08/955,448 filed on Oct. 21, 1997 an apparatus and methodology is disclosed wherein inherent variations in the surface topography of a disk substrate, such as variations in surface planarity, e.g., surface runout, are detected and a laser parameter adjusted in response to the detected surface variation. Such controlled texturing parameters include laser power, pulse duration, repetition rate and/or the distance between the microfocusing lens and the substrate surface.

Thus, conventional practices in texturing a substrate, e.g., a non-magnetic substrate or underlayer provided thereon, comprise decoupling the magnetic requirements (data zone on which information is recorded and read) from the mechanical requirements (landing zone), by forming a dedicated landing zone where the slider is parked and latched after the drive has been shut down. Baumgart et al. "Safe landings: Laser texturing of high-density magnetic disks" Data Storage, March 1996; U.S. Pat. No. 5,550,696 issued to Nguyen; and U.S. Pat. No. 5,595,791 issued to Baumgart et al. Accordingly, laser texturing has been employed to provide a landing zone having a topographical profile comprising a plurality of spaced apart protrusions extending above the substrate surface or a plurality of spaced apart depressions extending into the substrate surface. Typically, such laser texturing to provide a landing zone is performed on a non-magnetic substrate which has previously been polished by the substrate manufacturer to provide a specular or smooth surface which serves as the data zone.

Lasers have also been employed to inscribe a plurality of indelible grooves in a surface of a magnetic recording medium to function as optical servo tracks. Williams et al. U.S. Pat. No. 5,120,927. Laser techniques have also been employed to remove particular contamination from surfaces. Tam, "Laser-cleaning techniques for removal of surface particulates", J. Appl. Phys. 71 (7), Apr. 1, 1992, pp. 3515–3523.

It is recognized that the most significant magnetic properties of thin-film media are the remanence-thickness product ($M_rt$), coercivity ($H_c$) and coercive squareness ($S_*$). The concept of orientation ratio (OR) has been defined for magnetic media as a means to quantify and understand the directional nature of magnetic properties of a magnetic recording medium. Thus, the most common definition of OR is the ratio of $M_rt$, $H_c$ or $S_*$ in the tangential direction to values in the radial direction. Thus, in-plane anisotropies impact the OR for a particular magnetic recording medium including scratch. anisotropies. Thus, the mechanism for the OR results from a geometric effect and is based upon the preferential growth of crystallite chains due to a selfshadowing mechanism stemming from mechanical polishing. Johnson et al., "In-Plane Anisotropy in Thin-Film Media: Physical Origins of Orientation Ratio (Invited)", IEEE Transactions on Magnetics, Vol. 31, No. 6, November 1995, pp. 2721–2727.

Circumferential polishing or texturing of rigid disk substrates provides anisotropy in thin film magnetic disks which enhances coercivity in the track direction. The orientation in textured or polished thin film disks can be generated by magnetostatic effects arising from effective decoupling in the cross track direction. Such magnetostatic anisotropy increases in strength as the polishing grooves become finer and deeper. This effect is stronger where there is chain growth along the track direction. Miles et al., "Micromagnetic Simulation of Texture Induced Orientation in Thin Film Media", IEEE Transactions on Magnetics, Vol. 31, No. 6, November 1995, pp. 2770–2772.

As the requirements for high areal recording density increase, the need for improved substrate texturing for inducing magnetic orientation in a data zone increases. Such improved texturing requires fine, deep and uniform scratches which cannot be achieved employing conventional mechanical polishing techniques. Accordingly, there exists a need for improved methodology for texturing a non-magnetic substrate or underlayer thereon of a magnetic recording medium to provide a data zone with precisely formed uniform topographies to induce the requisite magnetic orientation in a subsequently applied magnetic layer.

DISCLOSURE OF THE INVENTION

An object of the present invention is a method and apparatus for uniformly texturing a data zone on a substrate for a magnetic recording medium.

Another object of the present invention is a method and apparatus for laser texturing a data zone and a landing zone on a substrate for a high areal recording density magnetic recording medium.

A further object of the present invention is a magnetic recording medium comprising a laser textured data zone.

Another object of the present invention is a magnetic recording medium comprising a laser textured data zone and a laser textured landing zone.

Additional objects, advantages and other features of the invention will be set forth in each description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising a landing zone and a laser textured data zone formed on a surface thereof.

Another aspect of the present invention is a magnetic recording medium having a substrate surface comprising a laser textured data zone containing a plurality of substantially uniform concentric microgrooves and a laser textured landing zone containing a plurality of substantially uniform protrusions or depressions.

A further aspect of the present invention is a method of manufacturing a magnetic recording medium, which method comprises: laser texturing a surface of a rotating substrate to form a laser textured data zone.

Another aspect of the present invention is a method of manufacturing a magnetic recording medium, which method comprises: impinging a continuous wave laser on a rotating substrate surface to form a laser textured data zone comprising uniform concentric microgrooves; and impinging a pulsed laser light beam on the substrate surface to form a laser textured landing zone comprising a plurality of substantially uniform protrusions or depressions.

A further aspect of the present invention is an apparatus for laser texturing a substrate for a magnetic recording medium, which apparatus comprises: a spindle for rotating a substrate during laser texturing; a source for emitting a continuous wave laser beam; and a microfocusing lens system positioned proximate a surface of the substrate through which the continuous wave laser is impinged on the rotating substrate surface to laser texture a data zone.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
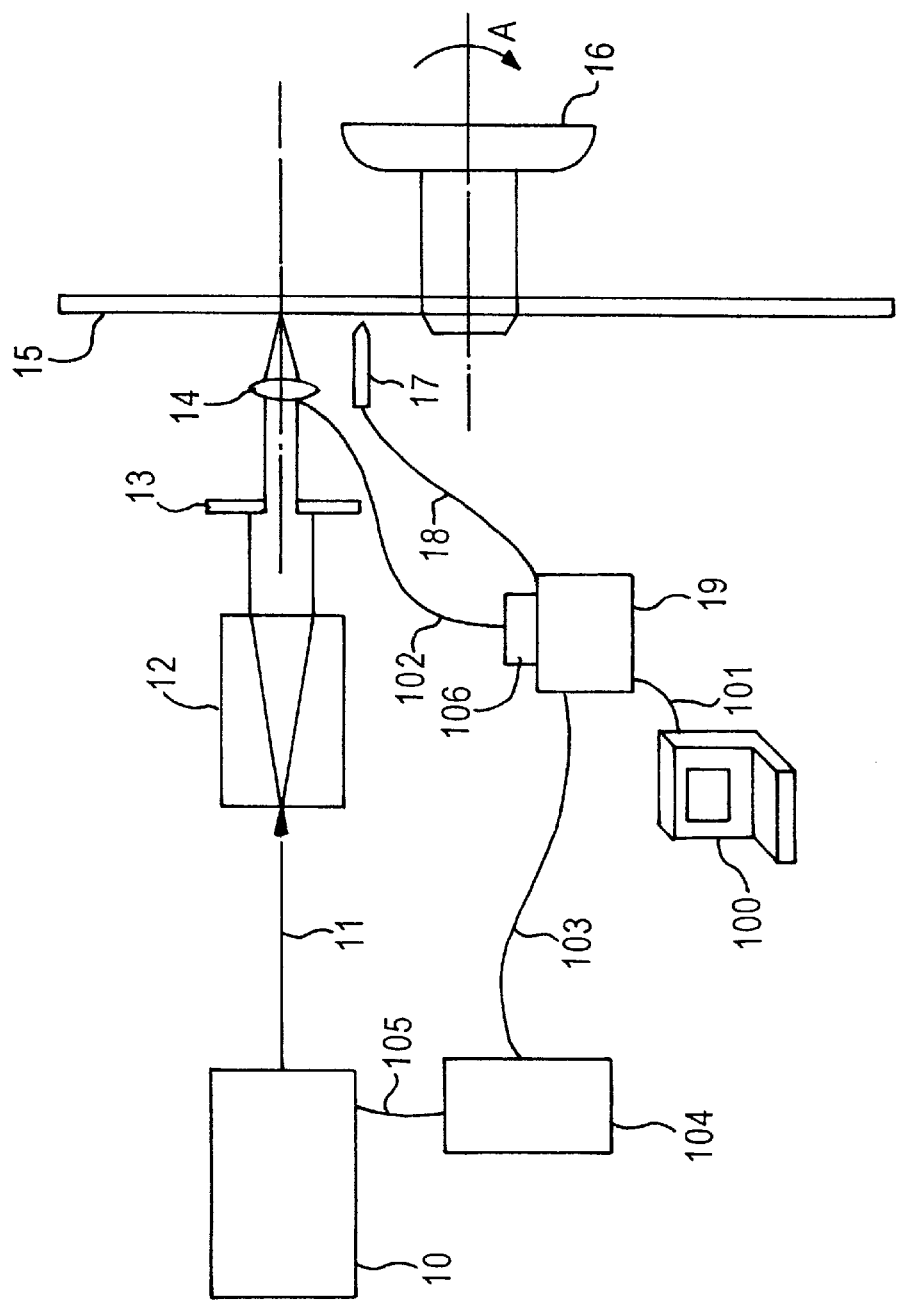
FIG. 1 illustrates a data zone laser texturing apparatus in accordance with an embodiment of the present invention.

Conventional magnetic recording media typically comprise a non-magnetic substrate having sequentially formed on opposite surfaces thereof one or more underlayers, a magnetic layer, a protective overcoat, typically containing carbon, and a lubricant topcoat. The non-magnetic substrate or an underlayer formed thereon is typically textured to form a landing zone, as by impinging a pulsed laser light beam thereon during substrate rotation to form a plurality of uniformly spaced apart protrusions or depressions, while the data zone typically comprises a polished specular surface. For example, a conventional aluminum alloy substrate, such as aluminum-magnesium substrate having an amorphous nickel-phosphorous (NiP) plating thereon is commercially available with a specular surface. The specular surface is textured to form the landing zone while the remaining polished specular surface functions as the data zone. The data zone can also comprise a plurality of scratches formed by mechanical polishing during substrate rotation for inducing magnetic orientation in the subsequently deposited magnetic layer. The minute polishing scratches in the data zone imparted by circumferential polishing produces in-plane isotropy enhancing coercivity ($H_c$) and impacting ($M_r t$) and $S_*$. These properties must be optimized for high areal recording density, thereby requiring formation of data zone microtexture with greater precision and uniformity.

In accordance with the present invention, a data zone having high precision and uniformity is achieved by laser texturing. In an embodiment of the present invention, a continuous wave laser light beam is impinged on a rotating substrate surface, the substrate constituting either the non-magnetic substrate or the non-magnetic substrate having one or more underlayers thereon. The continuous wave laser light beam can be derived from a yttrium-aluminum-garnet (YAG), yttrium-lithium-fluoride (YLF) or yttrium-vanadium-oxide ($YVO_4$) laser light beam source. The continuous wave laser light beam is passed through a microfocusing lens system and impinged on a rotating substrate surface to laser texture a data zone to provide a suitable microtopography for orientation of a subsequently deposited magnetic layer, such as a microtopography comprising a plurality of substantially uniform concentric microgrooves, with high precision.

In another embodiment of the present invention, a pulsed laser light beam is impinged on a rotating substrate surface or underlayer thereon, at a sufficiently high repetition rate to form a microtopography comprising a plurality of substantially uniform concentric microgrooves with substantially high precision, as in the embodiment employing a continuous wave laser light beam. For example, a pulsed laser light beam having a repetition rate of about 300 KHz to about 500 KHz provides substantially uniform concentric microgrooves. The use of such a high repetition rate provides a pulse laser width of about 100 nanoseconds to about 300 nanoseconds.

The microgrooves formed in accordance with the present invention employing a continuous wave laser light beam are uniform and precise and can be formed in fine patterns for improved areal recording density. In embodiments of the present invention, the microgrooves are spaced apart by a distance less than about 1.0 µm, e.g., less than about 0.5 µm. Typically, the spacings and dimensions of the microgrooves do not vary more than 10% among microgrooves. In embodiments of the present invention, microgrooves are formed having a width of about 0.2 µm to about 0.8 µm and a depth extending into the substrate surface a distance of about 10 Å to about 50 Å. The uniformity and precision of the laser textured data zones of the present invention provides optimum in-plane isotropies and OR, thereby achieving an $M_r t$ of about 0.5 to about 1.2 and $H_c$ of about 2,500 to about 5,000.

Embodiments of the present invention comprise passing a continuous wave laser light beam through a fiber optic cable, e.g., a single mode fiber optic cable, and then through the microfocusing lens system to impinge on the rotating substrate surface to form a laser textured data zone comprising a plurality of substantially uniform concentric microgrooves. A microfocusing lens system found suitable in the practice of the present invention comprises a bundle of fiber optic cables, each fiber optic cable linked to a microfocusing lens. The microfocusing lenses are arranged in an orthogonal array comprising a plurality of horizontally spaced microfocusing lenses and a plurality of vertically spaced apart microfocusing lenses. It has been found particularly suitable to employ a microfocusing lens system comprising a plurality of microfocusing lenses horizontally spaced apart by a distance of about 10 µm to about 2,000 µm and a plurality of microfocusing lenses vertically spaced apart by a distance of about 10 µm to about 300 µm.

The present invention can be implemented in combination with laser technology for laser texturing a landing zone. Such landing zone laser technology typically comprises impinging a pulsed laser light beam on a rotating substrate surface to create a topography comprising a plurality of substantially uniform spaced apart protrusions or depressions. Embodiments of the present invention comprise effectively decoupling the magnetic aspects from the mechanical aspects of a magnetic recording medium by laser texturing a substrate surface to provide a data zone comprising a plurality of uniformly spaced apart microgrooves and a separate laser textured landing zone which typically comprises a plurality of protrusions having a diameter of about 2 µm to about 8 µm, a height of about 60 Å to about 200 Å and a spacing of about 10 µm to about 50 µm.

As in conventional practices, a magnetic recording medium produced in accordance with the present invention comprises, sequentially, a non-magnetic substrate, at least one underlayer formed on opposite sides thereof, at least one magnetic layer formed on the underlayer, a protective overcoat formed on the magnetic layer and a lubricant topcoat formed on the protective overcoat. In accordance with embodiments of the present invention, the non-magnetic substrate or underlayer thereon is laser textured to form the data zone and landing zone, which textured data zone and landing zone are substantially reproduced on layers subsequently deposited thereon.

In practicing the present invention, the landing zone can be textured employing the apparatus and methodology disclosed in copending application Ser. No. 08/954,585 filed on Oct. 20, 1997 now U.S. Pat. No. 5,952,058, which apparatus and methodology comprises a fiber optic cable laser delivery system for optimum maintenance, and/or employing the apparatus and methodology disclosed in copending application Ser. No. 08/955,448 filed on Oct. 21, 1997, which apparatus and methodology comprises fiber optic probes and a data processing and a control system for detecting variations in surface planarity and controlling a laser texturing parameter in response to the detected surface variation to maintain uniform precision during laser texturing.

Embodiments of the present invention comprise providing an optical probe, e.g., a fiber optic probe, in proximity to the surface of a rotating substrate surface during laser texturing, as disclosed in copending application Ser. No. 08/955,448 filed on Oct. 21, 1997. In such embodiments, the fiber optic probe detects surface variations, including subtle variations in planarity, e.g., inherent surface waviness or runout. Light signals indicative of any such surface variations are fed back to an optical feedback data processing and control system wherein the light signals are converted into electrical signals in an associated interface module housed therein, the data analyzed and a laser parameter and/or the distance between a microfocusing lens or a microfocusing lens array and the substrate surface adjusted. The optical feedback data processing and control system contains an associated computer and a laser controller linked to a continuous wave laser light beam source and a pulsed laser light beam source. The laser optic systems comprise an automatic attenuator for appropriate adjustment of the power of the laser light beam in response to sensed surface variations to ensure uniform laser texturing. The distance between the microfocusing lens for laser texturing the landing zone and the substrate surface, and the distance between the microfocusing lens array for laser texturing the data zone and the substrate surface can also be adjusted in response to a detected surface variation, in lieu of or in addition to adjusting a laser parameter, to insure uniform laser texturing of the data zone and landing zone. The distance between the microfocusing lens array or microfocusing lens and substrate surface can be varied using conventional means, such as a through-the-lens autofocus optical system, a capacitance probe distance detector or other proximate control device.

Thus, embodiments of the present invention include positioning a microfocusing lens and a microfocusing lens array at a distance of about 500 μm to about 1,500 μm from opposite surfaces of a substrate on a rotating spindle. Optical probes, such as fiber optic probes, are positioned proximate opposite surfaces of the substrate during data and landing zone laser texturing to detect surface variations, such as surface planarity variations stemming from inherent waviness or surface runout. The fiber optic probes are linked to an optical feedback data processing and control system comprising a fiber optic probe-interface module, a processor with associated conventional peripheral equipment and laser controller for adjusting a relevant data or landing zone laser texturing parameter in response to a detected surface variation. The optical feedback data processing and control system can also comprise a mechanism controller linked to the microfocusing lenses and microfocusing lens arrays for adjusting the distance between each microfocusing lens and microfocusing lens array and opposite substrate surfaces and, hence, the focus to maintain uniform precision during texturing. Upon detecting an elevation, the laser power can be reduced or discontinued in response thereto or the distance between the microfocusing lens array and substrate surface increased in laser texturing the data zone. The pulse duration and repetition rate can be adjusted in response to a detected surface variation in combination with the power and/or distance between the microfocusing lens and substrate surface in laser texturing the landing zone. For example, upon detecting a surface elevation, the pulse duration can be reduced, the repetition rate reduced and/or the distance between the substrate and a microfocusing lens increased.

An apparatus in accordance with an embodiment of the present invention is illustrated in FIG. 1. Laser light beam 11 is passed from continuous wave laser light beam source 10, e.g., a YAG laser source, to beam expander 12, through aperture 12 and then through microfocusing lens 14 to impinge on a surface of substrate 15 rotated on spindle 16 in direction of arrow A. The impinging continuous wave laser light beam textures the rotating substrate surface to form a laser textured data zone comprising a plurality of concentric microgrooves with high precision and uniformity.

In the embodiment depicted in FIG. 1, a fiber optic probe 17 is positioned proximate rotating substrate 15. Fiber optic probe 17 is linked by fiber optic cable 18 to an optical feedback data processing and control system comprising processor 19 and peripheral terminal 100 via 101. Processor 19 is also linked to laser controller 104 via 103, while laser controller 104 is linked to laser light beam source 10 via 105. Processor 19 also includes displacement mechanism controller 106 as part of the optical feedback data processing and control system. Displacement mechanism control 106 is linked to microfocusing lens array 14 via 102. Upon detection of a surface variation by fiber optic probe 17, the laser power and/or distance between microfocusing lens system 14 and substrate surface 15 is adjusted to ensure laser texturing the data zone with high precision and uniformity.

Figure 2:
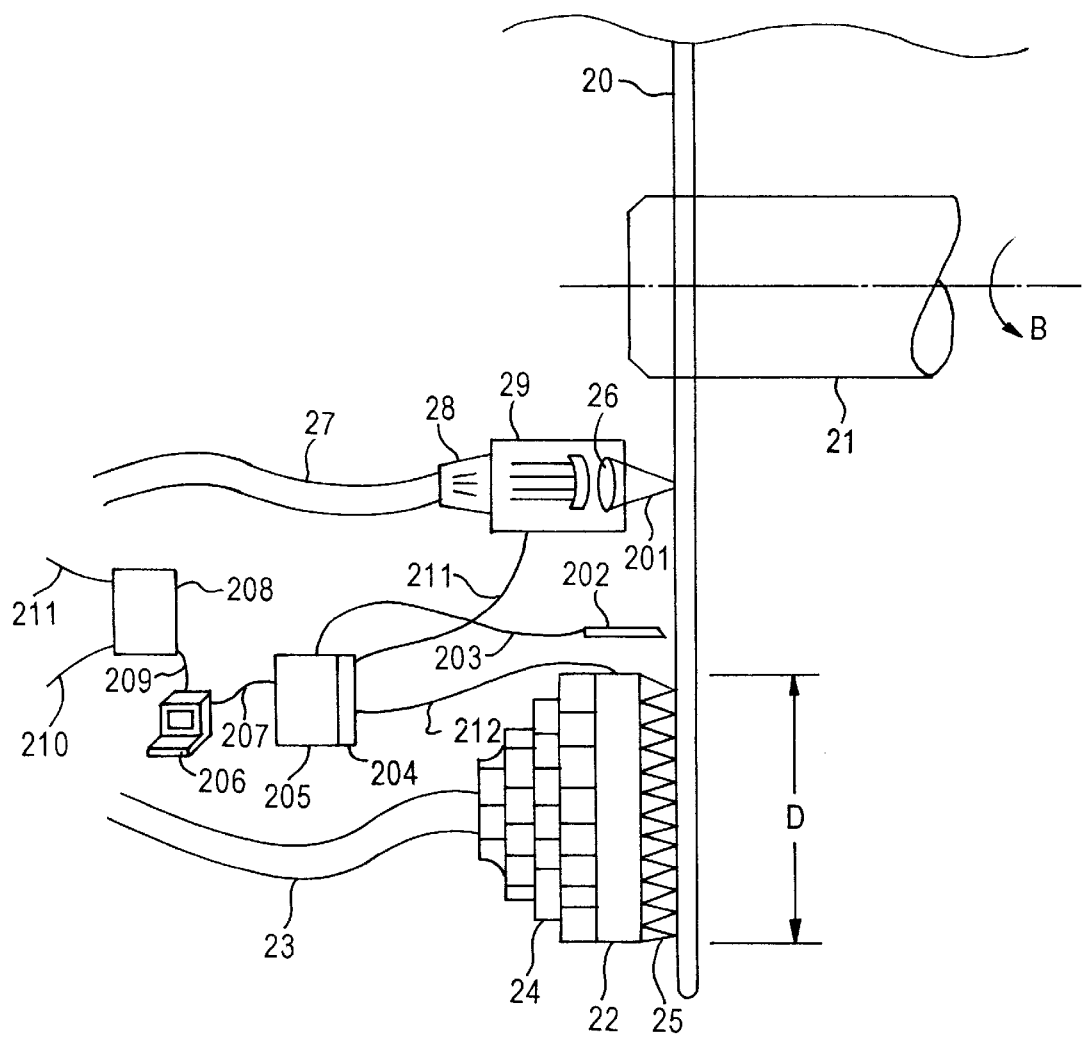
FIG. 2 illustrates another laser texturing apparatus in accordance with an embodiment of the present invention.

Another embodiment of the present invention is illustrated in FIG. 2, and includes elements for laser texturing decoupled data and landing zones. Substrate surface 20 is rotated on spindle 21 in direction of arrow B. Data zone D is laser textured employing microfocusing lens system 22 comprising a plurality of microfocusing lenses through which a continuous wave laser light beam is impinged to form a plurality of substantially uniform concentric microgrooves on rotating substrate surface 20. Each microfocusing lens of the microfocusing lens system is coupled to an optical fiber of a bundle (not shown) within multilevel optical fiber coupling 24. Fiber optic cable 23 optically links multilevel optical fiber coupling 24 to a continuous wave laser light beam.

In the embodiment depicted in FIG. 2, a landing zone is also laser textured on rotating substrate surface 20 by impinging a pulsed laser light beam thereon through microfocusing lens 26 optically linked to fiber optic cable 27 via fiber optic coupling 28 and snap-on columnator 29. Focused continuous wave laser light beams 25 impinge on rotating substrate 20 to laser texture a data zone comprising a plurality of substantially uniform concentric grooves, while focused pulsed laser light beam 201 impinges on rotating substrate 20 to laser texture a landing zone comprising a plurality of substantially uniform spaced apart protrusions.

In the embodiment depicted in FIG. 2, a fiber optic probe 202 is positioned proximate rotating substrate surface 20 for detecting a surface variation. Fiber optic probe 202 is linked via fiber optic cable 203 to an optical feedback data processing and control system comprising processor 205 and peripheral terminal 206 via 207. Processor 205 is linked to laser controller 208 via 209, while laser controller 208 is linked via 210 to a continuous wave laser light beam source for controlling the laser light beam power in response to a surface variation detected by fiber optic probe 202. Laser control 201 is also linked via 211 to a pulsed laser light beam source for adjusting a laser texturing parameter in response to a surface variation detected by fiber optic probe 202. Processor 205 also includes displacement mechanism controller 204 linked to microfocusing lens array 22 via 212 for adjusting the distance between microfocusing lens system 22 and rotating substrate surface 20 in response to a surface variation detected by fiber optic probe 202. Displacement mechanism controller 204 is also linked to microfocusing lens 29 via 211 for adjusting the distance between microfocusing lens 209 and rotating substrate surface 20 in response to a surface variation detected by fiber optic probe 202.

Figure 3:
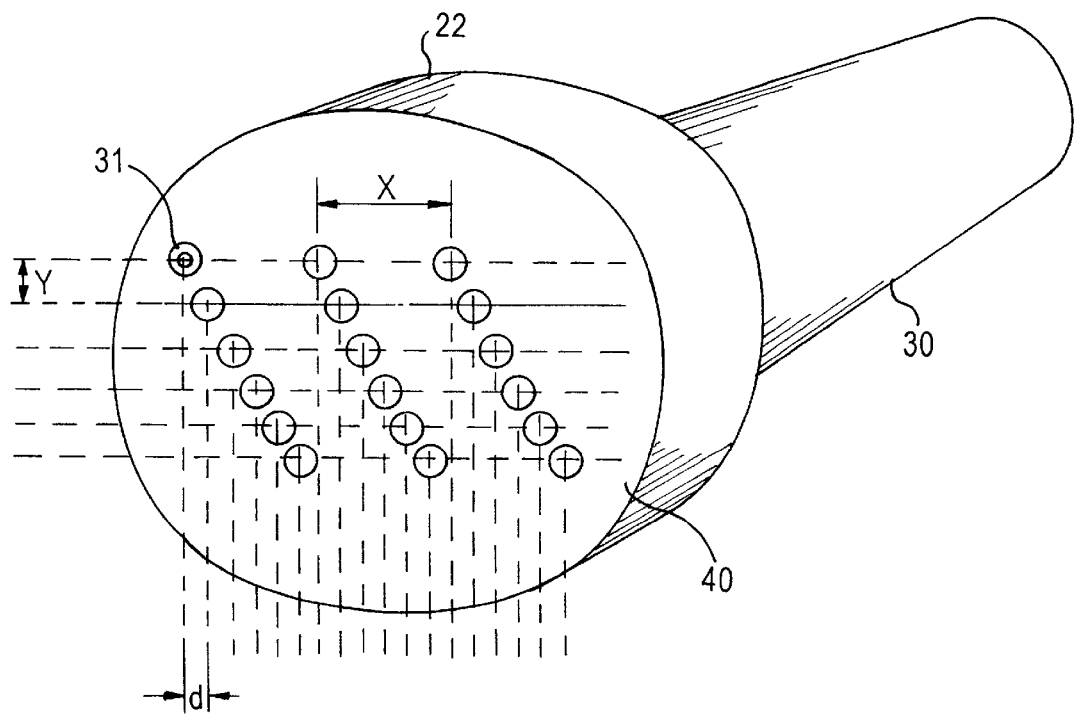
FIG. 3 illustrates an orthogonal microfocusing lens array in accordance with an embodiment of the present invention.
Figure 4:
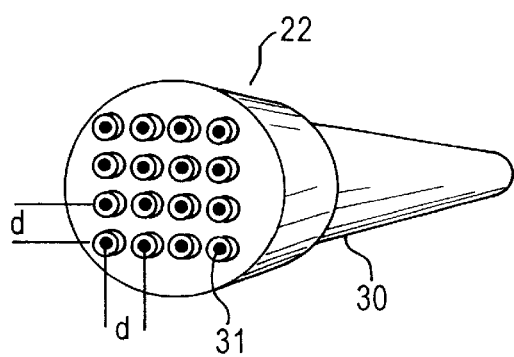
FIG. 4 illustrates a rectangular array of microfocusing lenses in accordance with an embodiment of the present invention.

The microfocusing lens array 22 employed in the present invention can comprise a fiber optic bundle within housing 30, each fiber optic cable leading to a microfocusing lens 31. In the embodiment depicted in FIG. 3, the microfocusing lenses of the microfocusing lens array are arranged in an array comprising a plurality of microfocusing lenses substantially horizontally spaced apart by a distance X of about 500 μm to about 2,000 μm and a plurality of microfocusing lenses substantially vertically spaced apart by a distance Y of about 100 μm to about 300 μm. In another embodiment of the present invention, as shown in FIG. 4, the microfocusing lens array comprises a substantially rectangular array of substantially horizontally spaced apart microfocusing lenses and substantially vertically spaced apart microfocusing lenses, by a similar distance d, e.g., about 10 μm to about 50 μm.

Embodiments of the present invention involve the use of conventional components which are commercially available. For example, the fiber optical probes employed in the present invention can be obtained from MTI located in Lantham, N.Y. The fiber optic probes for use in the present invention can also comprise a plurality of light transmitting fibers and a plurality of light receiving fibers. See, for example, Kissinger et al., "Fiber-Optic Probe Measures Runout of Stacked Disks", July–August 1997 Data Storage, pages 79–84. The use of control systems for responding to detected surface variations has previously been employed. See, for example, Muranushi et al., U.S. Pat. No. 5,153,785, the entire disclosure of which is incorporated herein by reference.

In practicing the present invention, the substrate can be any substrate typically employed in the manufacture of magnetic recording media, such as a metal substrate or an alternate substrate comprising a glass, ceramic or glass-ceramic material or such as O'Hara, Hoya and Nippon glass. Other conventional substrates include aluminum alloy substrates with a coating thereon, such as nickel-phosphorous. It has been found suitable to employ a $CO_2$ laser when texturing a glass, ceramic or glass-ceramic substrate, and YLF, $YVO_4$, and YAG lasers when texturing a NiP or metal substrate.

As one having ordinary skill in the art would recognize, conventional practices in manufacturing a magnetic recording medium comprise texturing opposite surfaces of a substrate and depositing a plurality of layers thereon. As one having ordinary skill in the art would also recognize, after laser texturing opposite substrate surfaces in accordance with the present invention, conventional layers are deposited thereon to complete the magnetic recording medium. For example, various conventional magnetic recording media comprise sequentially sputter deposited layers on the substrate, such as an underlayer, magnetic alloy layer and protective overcoat. A lubricant topcoat is also conventionally applied to the protective topcoat.

The magnetic layers deposited in accordance with the present invention can be any of those conventionally employed in the production of magnetic recording media. Such conventional magnetic alloys, include, but are not limited to, cobalt (Co) alloys, such as Co-base alloys, e.g., cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB) . The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, one or more underlayers can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention can be employed to produce any of various types of magnetic recording media, including thin film disks, with an attendant improvement in flying stability, glide performance and head-medium interface reliability. The present invention advantageously enables uniform precise laser texturing of a data zone of a magnetic recording medium to provide concentric microgrooves. In addition, the present invention also enables simultaneous laser texturing of a landing zone comprising a plurality of substantially uniform spaced apart protrusions or depressions, thereby effectively providing decoupling between the magnetic and mechanical characteristics of their magnetic recording medium. The present invention enables the production of high areal recording density magnetic recording media exhibiting optimized in-plane anisotropies and OR. The present invention can be employed to produce any of various types of magnetic recording media, particularly high areal recording density magnetic recording media.

Only the preferred embodiment of the invention and but a few examples of its versatility are shown and described in the present invention. It is to be understood that the invention is capable of use in various other combinations and environments and is capable of changes or modifications within the scope of the inventive concept as expressed herein.

What is claimed is:

1. A method of manufacturing a magnetic recording medium, which method comprises laser texturing a surface of a rotating substrate to form a laser textured data zone on which information is recorded and stored, the laser textured data zone comprising a plurality of concentric microgrooves suitable for orientation of a subsequently deposited magnetic layer.

2. The method according to claim 1, comprising laser texturing opposite surfaces of the substrate to form a laser textured data zone thereon.

3. The method according to claim 2, comprising laser texturing opposite surfaces of a rotating non-magnetic substrate to form a laser textured landing zone and a laser textured data zone on each surface; and depositing sequentially thereon:

at least one underlayer;

a magnetic layer;

a protective overcoat; and a lubricant topcoat; wherein, the laser textured data zone and the laser textured landing zone are substantially reproduced in the subsequently deposited layers.

4. The method according to claim 1, comprising impinging a high repetition rate pulsed laser light beam on the rotating substrate surface to form the laser textured data zone.

5. The method according to claim 4, comprising impinging a pulsed laser light beam at a repetition rate of about 300 KHz to about 500 KHz on the rotating substrate surface to laser texture the data zone by forming a plurality of substantially uniform concentric microgrooves.

6. The method according to claim 4, wherein the high repetition rate laser light beam has a repetition rate of about 300 KHz to about 500 KHz.

7. A method of manufacturing a magnetic recording medium, which method comprises impinging a continuous wave laser light beam on a rotating substrate surface to form a laser textured data zone on which information is recorded and stored, the laser textured data zone comprising a plurality of concentric microgrooves suitable for orientation of a subsequently deposited magnetic layer.

8. The method according to claim 7, wherein the continuous wave laser is derived from a yttrium-aluminum-garnet, yttrium-lithium-fluoride or vanadium-yttrium-oxide laser source.

9. The method according to claim 7, comprising passing the continuous wave laser light beam through a fiber optic cable and then through a microfocusing lens system to impinge on the rotating substrate surface to laser texture the data zone.

10. The method according to claim 9, wherein the microfocusing lens system comprises a bundle of fiber optic cables, each fiber optic cable linked to a microfocusing lens.

11. The method according to claim 10, wherein the plurality of microfocusing lenses are arranged in a substantially rectangular array of substantially horizontally spaced apart microfocusing lenses by a distance of about 10 μm to about 50 μm and substantially vertically spaced apart microfocusing lenses by substantially the same distance of about 10 μm to about 50 μm.

12. The method according to claim 10, wherein the plurality of microfocusing lenses are arranged in an array comprising a plurality of horizontally spaced apart microfocusing lenses and a plurality of vertically spaced apart microfocusing lenses.

13. The method according to claim 12, wherein the plurality of microfocusing lenses are horizontally spaced apart by a distance of about 10 μm to about 2,000 μm; and a plurality of microfocusing lenses are vertically spaced apart by a distance of about 10 μm to about 300 μm.

14. A method of manufacturing a magnetic recording medium, which method comprises laser texturing a rotating substrate surface to form a laser textured data zone on which information is recorded and stored, the laser textured data zone comprising a plurality of substantially uniform concentric microgrooves suitable for orientation of a subsequently deposited magnetic layer.

15. The method according to claim 14, wherein each microgroove has a width of about 0.2 μm to about 0.8 μm and extends into the surface to a depth of about 10 Å to about 50 Å.

16. The method according to claim 14, wherein the microgrooves are spaced apart by a distance of less than about 1.0 μm.

17. The method according to claim 16, wherein the microgrooves are spaced apart by a distance of less than about 0.5 μm.

18. A method of manufacturing a magnetic recording medium, which method comprises:

laser texturing a surface of a rotating substrate to form a laser textured data zone on which information is recorded and stored, the laser textured data zone comprising a plurality of concentric microgrooves suitable for orientation of a subsequently deposited magnetic layer; and impinging a pulsed laser light beam on the rotating substrate surface to form a laser textured landing zone comprising a plurality of substantially uniform spaced apart protrusions or depressions during laser texturing the data zone.

19. The method according to claim 18, comprising impinging the pulsed laser light beam on the rotating substrate surface to form a laser textured landing zone comprising a plurality of protrusions having a diameter of about 2 μm to about 8 μm, a height of about 60 Å to about 200 Å and a spacing of about 10 μm to about 50 μm.

20. The method according to claim 18, further comprising:

detecting a variation in the planarity of the substrate surface undergoing laser texturing; and controlling a laser texturing parameter for laser texturing the data zone in response to the detected surface variation.

21. The method according to claim 20, comprising detecting the variation in planarity with a fiber optic probe.

22. The method according to claim 20, comprising adjusting any or a combination of the laser power and distance between the microfocusing lens array and substrate surface in response to a detected surface variation in laser texturing the data zone.

23. The method according to claim 22, further comprising adjusting any or a combination of the laser power, laser pulse duration, laser repetition rate and distance between the microfocusing lens and substrate surface in response to a detected surface variation in laser texturing the landing zone.

24. A method of manufacturing a magnetic recording medium, the method comprising passing a continuous wave laser light beam through a fiber optic cable and then through a microfocusing lens system to impinge on a rotating substrate surface to laser texture a data zone, wherein the microfocusing lens system comprises a bundle of fiber optic cables, each fiber optic cable linked to a microfocusing lens; and the plurality of microfocusing lenses are horizontally spaced apart by a distance of about 10 μm to about 2,000 μm; and a plurality of microfocusing lenses are vertically spaced apart by a distance of about 10 μm to about 300 μm.

25. A method according to claim 24, wherein the horizontally spaced apart microfocusing lenses are spaced apart by a distance of about 10 μm to about 50 μm and the vertically spaced apart microfocusing lenses are spaced apart by substantially the same distance of about 10 μm to about 50 μm.

26. A method of manufacturing a magnetic recording medium, the method comprising laser texturing a rotating substrate surface to form a laser textured data zone comprising a plurality of substantially uniform concentric microgrooves spaced apart by a distance of less than about 1.0 μm.

27. A method of manufacturing a magnetic recording medium, the method comprising:

laser texturing a surface of a rotating substrate to form a laser textured data zone;

impinging a pulsed laser light beam on the rotating substrate surface to form a laser textured landing zone comprising a plurality of protrusions having a diameter of about 2 μm to about 8 μm, a height of about 60 Å to about 200 Å and a spacing of about 10 μm to about 50 μm;

detecting a variation in the planarity of the substrate surface undergoing laser texturing with a fiber optic probe; and controlling a laser texturing parameter for laser texturing the data zone in response to the detected surface variation.

28. A method of manufacturing a magnetic recording medium, the method comprising impinging a high repetition rate pulsed laser light beam on a rotating substrate surface to form a laser textured data zone, wherein the high repetition rate laser light beam has a repetition rate of about 300 KHz to about 500 KHz.

29. The method according to claim 28, comprising impinging the pulsed laser light beam at a repetition rate of about 300 KHz to about 500 KHz on the rotating substrate surface to laser texture the data zone by forming a plurality of substantially uniform concentric microgrooves.

* * * * *